(12) United States Patent
Navratil et al.

(10) Patent No.: US 7,420,561 B2
(45) Date of Patent: Sep. 2, 2008

(54) DIAGNOSTIC VISUAL TOOLS AND METHODS FOR GRAPHICAL COMPARISON OF DATA POINT AND HISTORICAL DATA DENSITY

(75) Inventors: Roman Navratil, Prague (CZ); Karel Marik, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/160,651

(22) Filed: Jul. 1, 2005

(65) Prior Publication Data

US 2007/0002051 A1    Jan. 4, 2007

(51) Int. Cl.
G06T 11/20    (2006.01)
(52) U.S. Cl. ...................... 345/440; 345/629
(58) Field of Classification Search ................. 345/420, 345/440
See application file for complete search history.

(56) References Cited

U.S. PATENT DOCUMENTS

| | | | |
|---|---|---|---|
| 5,265,246 A | 11/1993 | Li et al. | |
| 5,428,737 A | 6/1995 | Li et al. | |
| 5,499,368 A | 3/1996 | Tate et al. | |
| 5,519,859 A | 5/1996 | Grace | |
| 5,546,516 A | 8/1996 | Austel et al. | |
| 5,732,121 A | 3/1998 | Takeo et al. | |
| 5,784,273 A | 7/1998 | Madhavan | |
| 5,787,411 A | 7/1998 | Groff et al. | |
| 5,907,634 A | 5/1999 | Brown et al. | |
| 5,986,673 A * | 11/1999 | Martz | 345/649 |
| 6,029,162 A | 2/2000 | Schultz | |
| 6,192,312 B1 | 2/2001 | Hummelsheim | |
| 6,239,740 B1 | 5/2001 | Collins et al. | |
| 6,263,339 B1 | 7/2001 | Hirsch | |
| 6,282,547 B1 | 8/2001 | Hirsch | |
| 6,317,683 B1 | 11/2001 | Ciprian et al. | |
| 6,470,352 B2 | 10/2002 | Yaginuma | |
| 6,473,080 B1 | 10/2002 | Brown et al. | |
| 6,477,538 B2 | 11/2002 | Yaginuma et al. | |
| 6,662,185 B1 | 12/2003 | Stark et al. | |
| 6,707,454 B1 | 3/2004 | Barg et al. | |
| 6,816,867 B2 | 11/2004 | Jevons et al. | |
| 6,820,006 B2 | 11/2004 | Patera | |
| 6,826,292 B1 | 11/2004 | Tao et al. | |
| 2002/0078039 A1 | 6/2002 | Cereghini et al. | |

(Continued)

OTHER PUBLICATIONS

Gill et al., "What to Do When Your Hessian is Not Invertible, Alternatives to Model Respecification in Nonlinear Estimation," Sociological Methods & Research, vol. 32, No. 4, pp. 1-34, Apr. 2004.

(Continued)

*Primary Examiner*—M Good Johnson
(74) *Attorney, Agent, or Firm*—Kris T. Fredrick

(57) ABSTRACT

Methods, computer program products, and systems adapted to aid in data analysis by graphically displaying current situation on the background of historical data density, Historical data density is represented by one or more contour plots. An indicator of how a current data point compares to the historical data may be placed on one or more of the data density graphs. In some examples, data falling outside a threshold contour of historical data density may represent a new or an abnormal situation, and such data and/or a contour plot having such data may be highlighted in a graphical display.

20 Claims, 6 Drawing Sheets

U.S. PATENT DOCUMENTS

| | | | |
|---|---|---|---|
| 2003/0195880 | A1 | 10/2003 | Mancinelli |
| 2004/0117403 | A1 | 6/2004 | Horn et al. |
| 2004/0183800 | A1* | 9/2004 | Peterson ..................... 345/440 |
| 2004/0253642 | A1 | 12/2004 | Zimmerman et al. |

OTHER PUBLICATIONS http://cheval.vet.gla.ac.uk/kvass/stats/Statsoft%20Manual/glosf.html, StatSoft, Inc., 18 pages, printed Mar. 17, 2005.

http://www.itl.nist.gov/div898/handbook/eda/section3/contour.htm, "Contour Plot," Engineering Statistics Handbook, 3 pages, printed Jun. 14, 2005.

http://www.itl.nist.gov/div898/software/dataplot/refman1/auxillar/scatplma.htm, "Scatter Plot Matrix," Dataplot, 12 pages, printed Mar. 17, 2005.

http://www.itl.nist.gov/div898/software/dataplot/refman1/auxillar/dexcplot.htm, "Dex Contour Plot," Dataplot, 7 pages, printed Mar. 17, 2005.

http://www.maths.lth.se/help/R/.R/library/sn/html/st.2logL.profile.html, "Profile Twice Loglikelihood for Skew-t Models," 2 pages, printed Mar. 17, 2005.

http://www.statit.com/statitcustomqc/customqc_custom_graphics.htm, 2 pages, printed Mar. 17, 2005.

* cited by examiner

DIAGNOSTIC VISUAL TOOLS AND METHODS FOR GRAPHICAL COMPARISON OF DATA POINT AND HISTORICAL DATA DENSITY

FIELD

The present invention is related to the field of data analysis. More specifically, the present invention relates to graphical analysis of data using a graphical user interface.

BACKGROUND

Statistical data related to business and technology operations can be readily amassed in great amounts using recent innovations. The sheer amount of data, however, can make it difficult for a user untrained in statistical techniques to grasp what a collection of data means and how historical data relates to present or recent situation. Graphical interfaces that allow greater access to and easier understanding of amassed data are in demand.

SUMMARY

The present invention relates to methods, computer program products, and systems adapted to aid in data analysis by graphically displaying one or more graphs related to historical data density in conjunction with data from a given data point. In an illustrative example, a plurality of data density graphs are displayed, indicating historical data density for a plurality of variables. An indicator of how a data point compares to the historical data may be placed on one or more of the data density graphs. In some embodiments, data falling outside historical data density can represent a new or an abnormal situation; this may be highlighted in a graphical display.

Computer program products and systems for performing similar methods are also described.

DETAILED DESCRIPTION

The following detailed description should be read with reference to the drawings. The drawings, which are not necessarily to scale, depict illustrative embodiments and are not intended to limit the scope of the invention.

As used herein, the term "data point" is used to refer to a data element having one or more dimensions. A data point may be represented graphically in several different ways depending upon the graphical format. Data points may relate to any type of data such as system state data, event data, outcomes, business events, etc. A data density function or graph may include, for example, a probability density/distribution function, a histogram, or other graph relaying information related to the density of data, often using multiple dimensions in so doing.

Figure 1A:
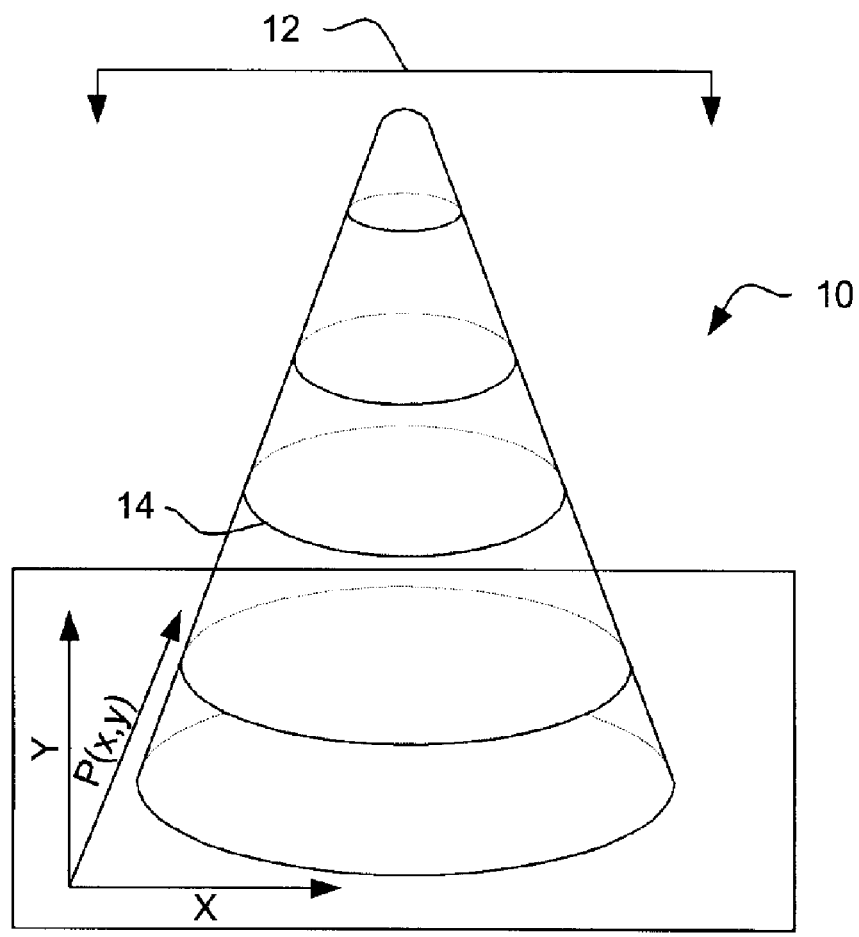
FIGS. 1A-1B illustrate forming a two dimensional contour plot from a three dimensional figure.
Figure 1B:
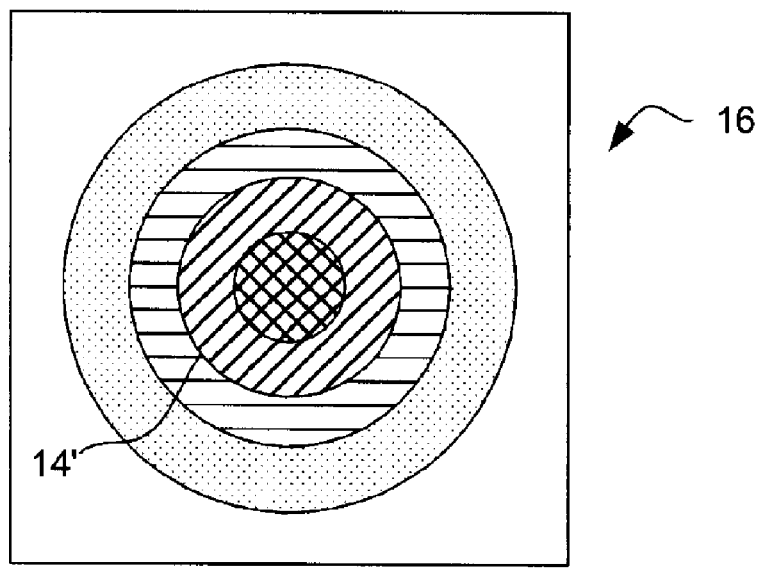

FIGS. 1A-1B illustrate the formation of a two dimensional contour plot from a three dimensional figure. Referring to FIG. 1A, a cone shape 10 is illustrated. The cone shape 10 may be an illustration of a probability distribution mapping in two variables, with X and Y coordinates as shown, and P(x,y), being the joint probability distribution or probability density function, as a dependent variable represented as the height of the cone shape 10. In case of normal data distribution in both x and y, the cone will be shaped according to the Gaussian curve.

While the three dimensional image of FIG. 1A is nice for understanding an interrelationship in a system having only X and Y variables, additional variables cannot be effectively shown. In an illustrative embodiment of the present invention, the illustrated shape in FIG. 1A is converted into a simpler 2-dimensional image, as shown in FIG. 1B. This is done by treating the cone shape 10 as a topography image, looking "down" from 12, and slicing the cone shape 10 transversely, for example, as shown at 14. The outer contours of the slices are then shown in FIG. 1B, with line 14' in FIG. 1B corresponding to the outer contour of slice 14 in FIG. 1A. The result is a contour plot 16. In some embodiments the lines in the contour plot 16 may have distinct colors, patterns or weights. Further, the spaces between the lines in the contour plot 16 may be distinctly shaded, colored, or patterned to differentiate between levels of probability. In the illustrative embodiment, distinct patterns have been used to differentiate different levels of probability.

Figure 2:
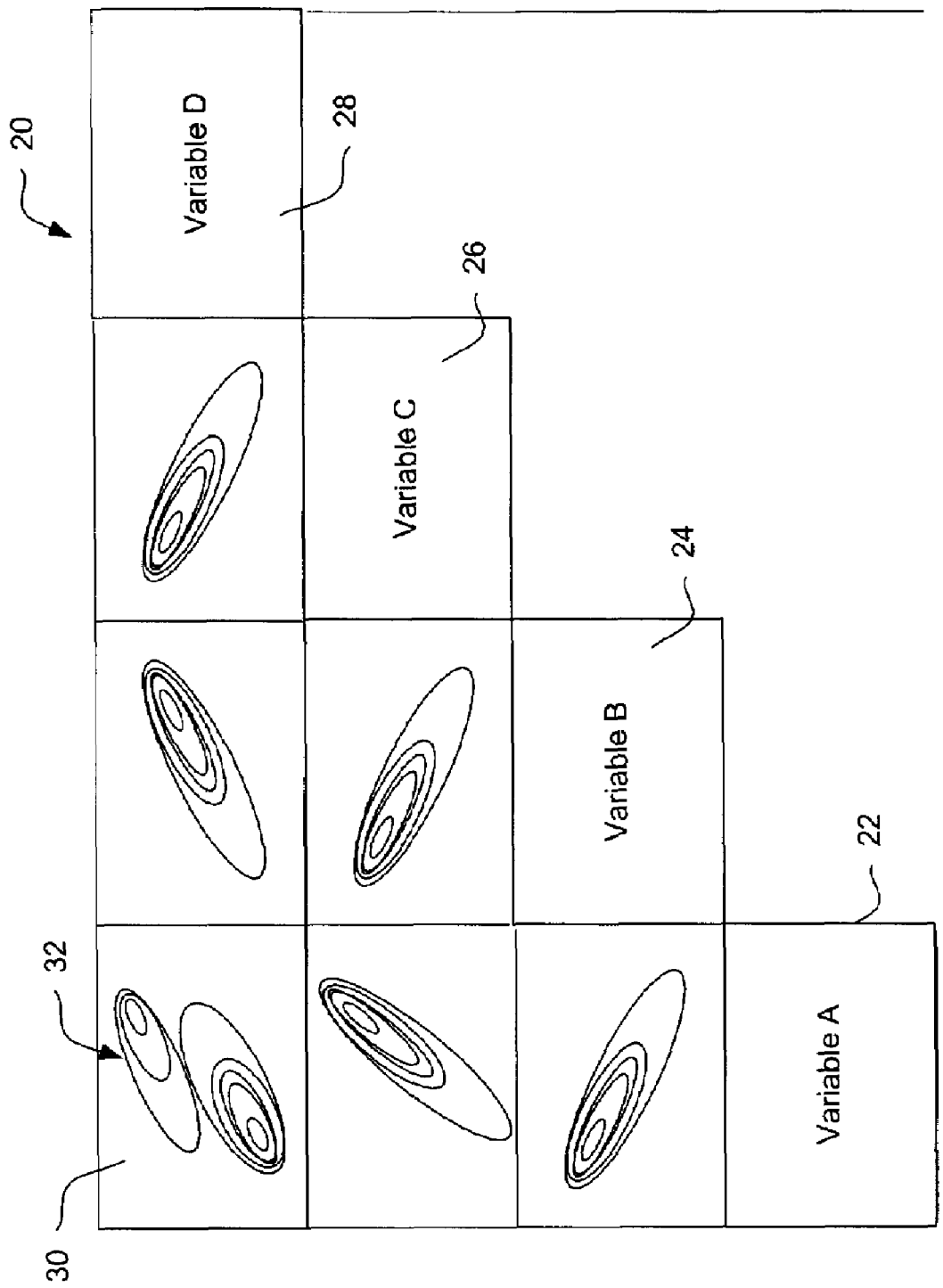
FIG. 2 shows graphical display of a plurality of data density plots at once.

The P(x,y) surface can also have more than one peak, resulting in more than one contour centers as shown in FIG. 2, at contour plot 32. The illustrative shape in FIG. 1 is thus not intended to be limiting. Joint probability contours are one type of data density plot, and may represent historical data.

FIG. 2 shows the graphical display of a plurality of data density plots at once. The display 20 shows combinations of two dimensional joint probability density functions in a multivariable system including Variable A 22, Variable B 24, Variable C 26, and Variable D 28. For example, contour plot 30 illustrates, using a plurality of lines 32, the contours of a joint probability distribution plot, P(a,d), for variables A 22 and D 28.

In some embodiments, the plurality of plots 30 may be "normalized", where normalizing the plots 30 indicates placing contour lines such that the contour lines provide consistent indications across several plots 30 of the relationship between a data point and historical data. The lines 32 within each plot 30 may, in some embodiments, have a preselected correspondence. For example, each line may represent a standard deviation or a required data percentile. In an illustrative example, standard deviation is used, and three contour lines are shown in each plot. In some embodiments, percentiles may be used to reflect historical data frequency. In an illustrative example, five contour lines are provided, one each at percentiles of 5%, 15%, 30%, 70%, 85%, and 95%. When the contour lines in each plot are normalized, this means that each plot is shown in the same way. Some embodiments use normalized contour lines in the plots 30, while others do not; this may vary depending upon user preference.

The graphical display 20 thus provides a graphical matrix of probability relationships. The display 20 may be generated using a probability density function or other suitable statistical approach.

Display 20 may also include mirrored images of the contour plots shown, with the mirrored images shown on the lower right-hand side (not shown). Display 20 may be effected by the use of any suitable image display apparatus such as a computer monitor, a suitable screen display such as those used with laptop computers and/or graphing calculators, television, projector, etc. The display 20 may also take the form of a printed plot. The statistical analysis and graphical function used to construct the data for display 20 may be performed using any suitable computer-type device such as a personal computer, a calculator, or other computers, or may be performed with a more application specific device such as a microprocessor having suitable data inputs/outputs and, if desired, memory.

It should be noted that in FIGS. 2-5, the illustrative graphs shown do not represent any particular data and are presented for illustrative purposes.

Figure 3:
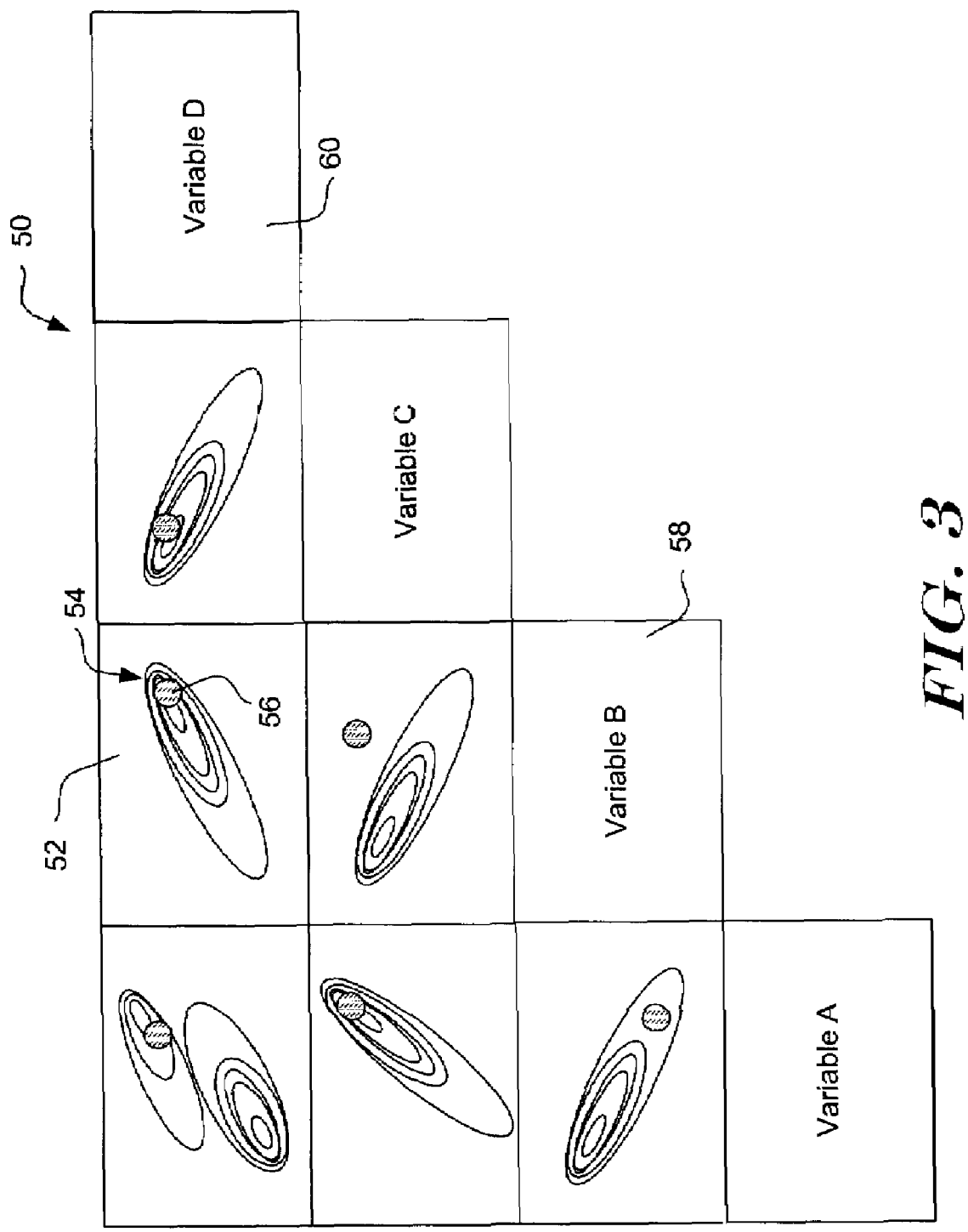
FIG. 3 shows graphical display of a data point marker superimposed on a plurality of data density plots.
Figure 4:
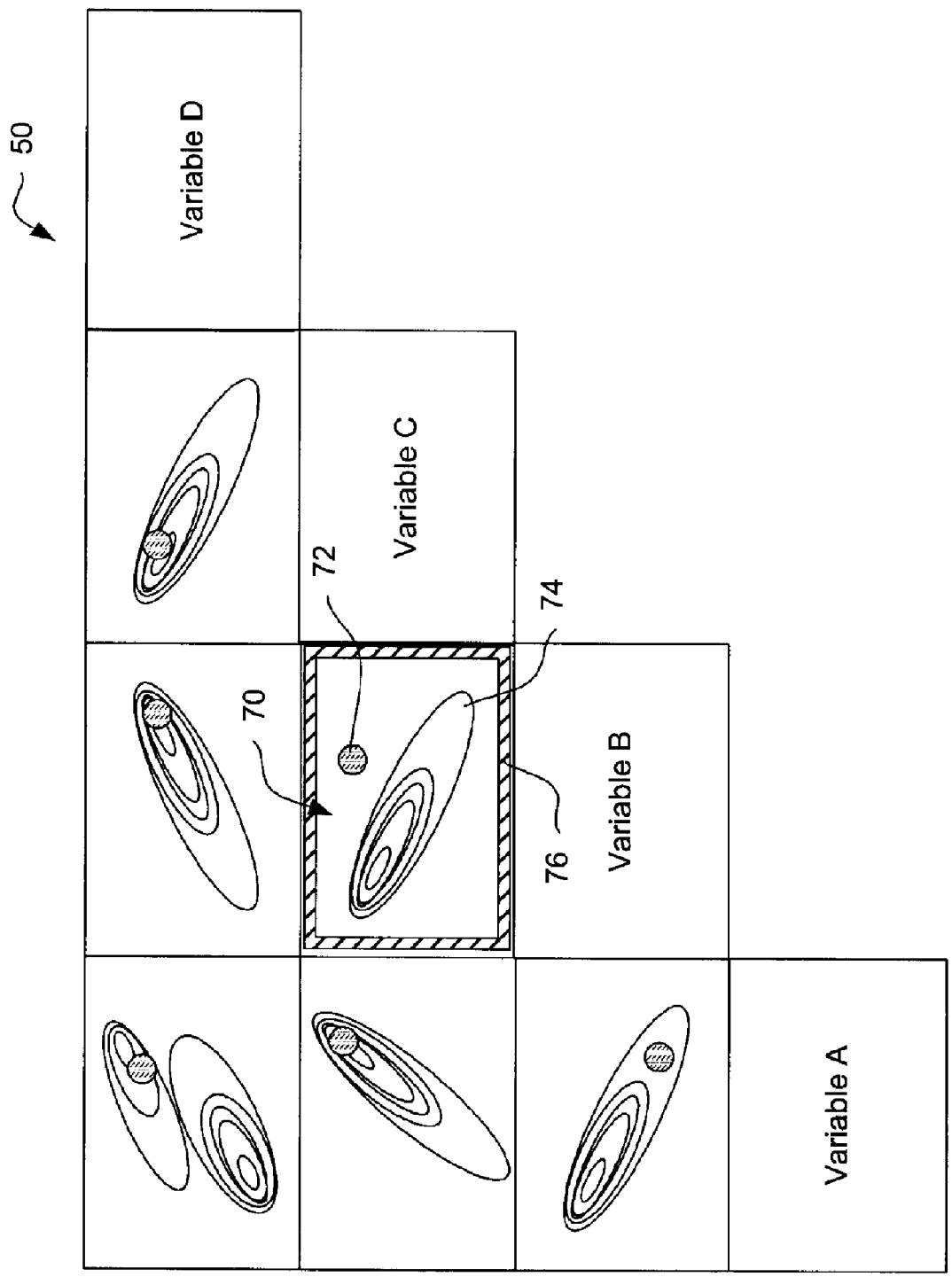
FIG. 4 shows graphical display of an abnormal data point by the use of an data point marker superimposed on a plurality of data density plots.

FIG. 3 shows the graphical display of a data point superimposed on a plurality of data density plots. The display 50 includes a number of plots including plot 52, with lines 54 indicating data density given the X-Y position in the plot 52. A data point is indicated by marker 56 according to values corresponding to the data point. The data point is illustrated on several tiles of the graphical display, with each tile corresponding to another data density plot. It can be seen that in plot 52, the data point 56 falls along or within several of the contour lines 54. The position of data point 56 with respect to the contour lines 54 indicates how data point 56 fits into historical relationships between variables A and B. If the data point 56 is lying within the historical data density represented by the contour lines 54, this may indicate that the data point 56 has similar behavior to at least some historical data. In some embodiments this may indicate, that circumstances associated with the data point are considered to be normal. If the data point 56 is lying outside the historical data density represented by the contour lines 54, this indicates that the data point 56 does not have similar behavior as historical data. In some embodiments this may indicate that the situation is considered new, or abnormal, FIG. 4 shows the graphical display of a data point by the use of a data point marker superimposed on a plurality of data density graphs. Specifically, in FIG. 4, a plot 70 shows a data point marker 72 falling well away from distribution lines 74 which, in the plot 70, indicates that the data point is outside usual historical relationships between this pair of variables. In the illustrative example, the plot 70 is highlighted by frame 76 to indicate that the data point may be considered as abnormal according to the probability distribution represented in plot 70. A user can then determine that the data point is considered to be outside historical relationships. The user can also observe in which specific combination of variables is the pair relationship within or outside historical data density.

In some embodiments, the user is able to move a cursor (for example using a mouse or other commands) and click on any of the plots shown in the display 50. The user may also be allowed to select different variables to view in place of those already shown. In another embodiment, the user can select to view raw data for a data point, and/or may choose to view a different graph type for one or more variables.

Instead of a frame 76, the tile associated with the plot 70 may change colors, flash, etc., to highlight the plot 70.

Figure 5:
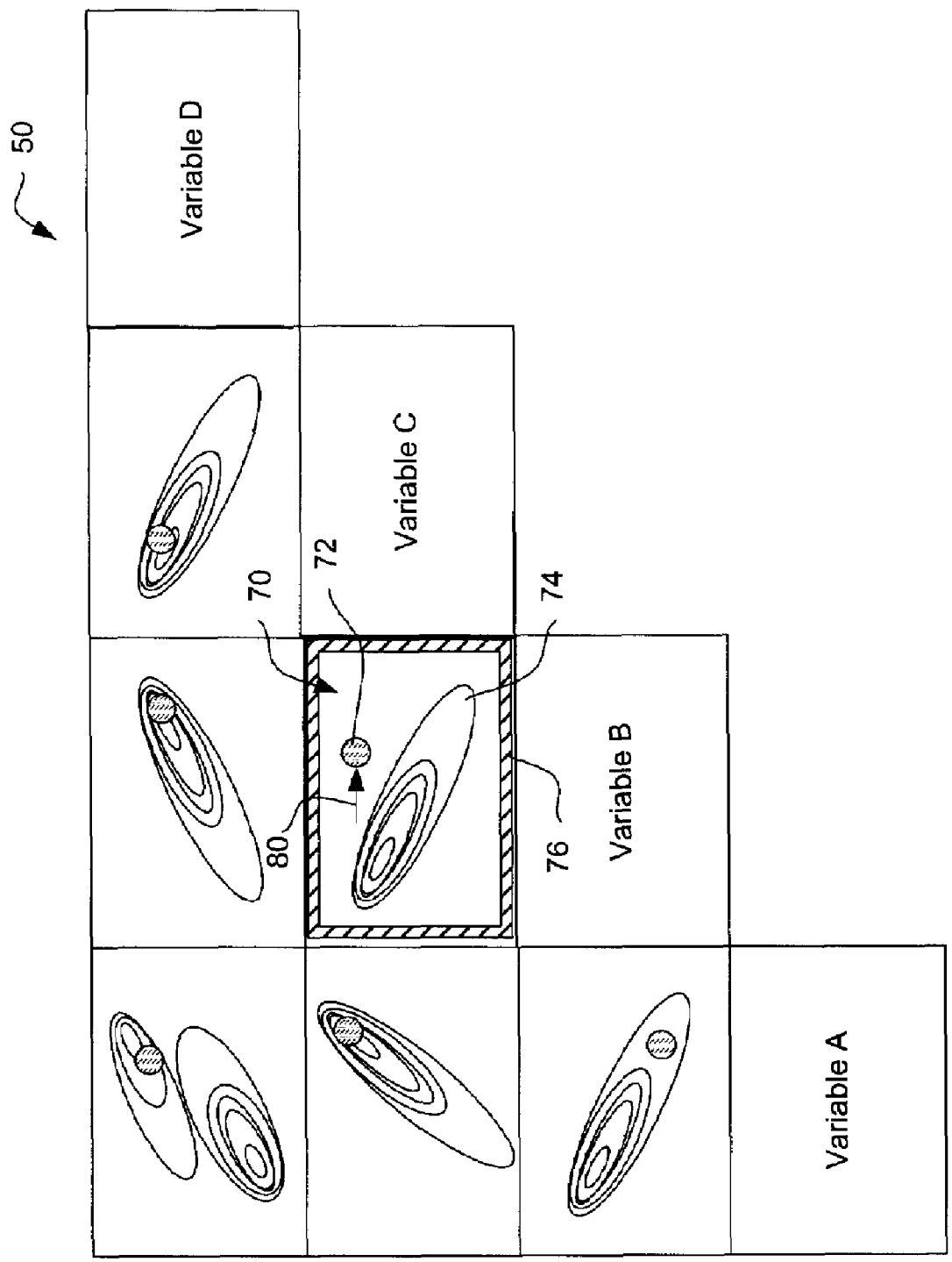
FIG. 5 shows graphical display of an abnormal data point by the use of an data point marker superimposed on a plurality of data density graphs, including trajectory data.

FIG. 5 shows the graphical display of data point which is considered to be abnormal by the use of an data point marker superimposed on a plurality of data density graphs, including data point trajectory data. FIG. 5 is the same as FIG. 4 except that trajectory data is now shown. Specifically, superimposed on the plot 70 is line 80 that indicates a trajectory, over time, of data point maker 72. This allows further diagnosis of the data point 72 by a user.

While in FIG. 5 the trajectory is only indicated in the plot 70 that indicates an abnormal data point, trajectory may be shown in the other plots as well. The trajectory may be shown in any suitable fashion, including, for example, a frame-by-frame trajectory, animation, or any suitable indication of previous positions such as that shown in FIG. 5.

Figure 6:
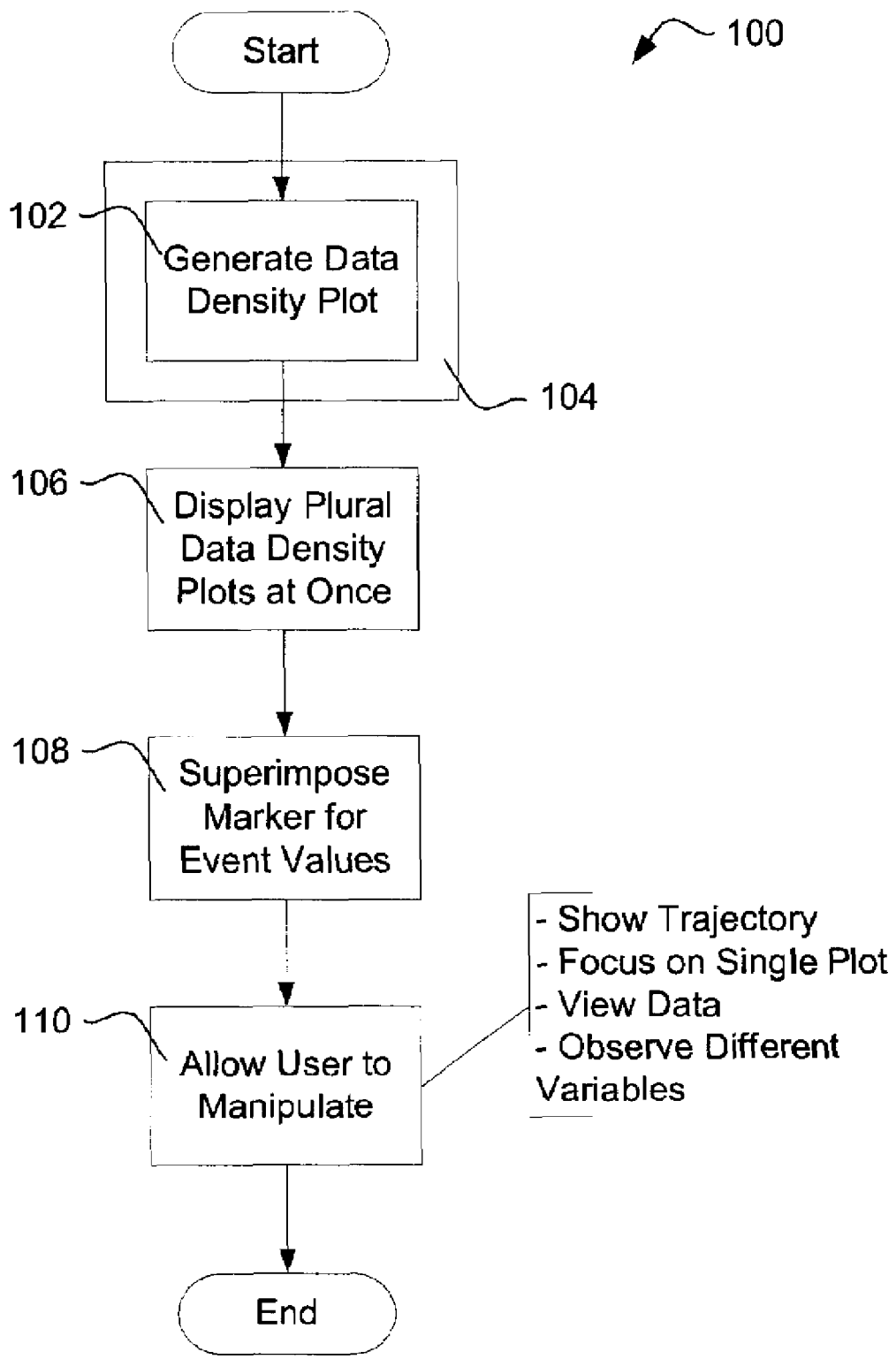
FIG. 6 is a block diagram for an illustrative method.

FIG. 6 is a block diagram for an illustrative method. The method 100 begins with a start block and proceeds to generate a data density plot, as shown at 102. The step of generating a data density plot at 102 may be performed by any suitable computational method/device, including a computer. As indicated by block 104, step 102 may be repeated to generate several data density plots.

Next, one or more of the data density plots are displayed at once, as shown at 106. For example, the plot(s) may be displayed on a computer screen or other suitable display for observation by a user. In some embodiments, the method may end here to allow a user to observe and obtain diagnostic information regarding the system-wide probability relationships as indicated by the use of several data density plots.

In some embodiments, the method may continue to step 108, where a marker representing data point values is superimposed upon one, several, or all of the data density plots that were displayed in step 106. Again, the method may end here in some embodiments. In some embodiments, if the data point marker falls outside of a threshold contour, the contour plot in which the threshold is passed may be highlighted. A threshold contour may be defined in any suitable manner, and may depend upon the format of the variables. The threshold contour may represent a certain percentage of data density peak height, or may represent an absolute threshold for data density. Threshold contours may be set by the use of a normalization process or may be selected in light of conditions, system needs (i.e. safety precautions), or other suitable factors.

The step of superimposing a marker for data point values at 108 may include determining whether the data point marker falls outside of a specified boundary on one or more contour plots. If so, then the step of superimposing a marker for data point values at 108 may further include highlighting or otherwise indicating which contour plots show the data point marker falling outside of a specified boundary. The method may also end after such analysis and highlighting.

The step of superimposing a marker for data point values at 108 may also include displaying a trajectory for the data point marker. Again, in some embodiments, the method ends after this step.

The method may continue to step 110, where the user is allowed to manipulate one or more of the trajectory plots. Illustrative ways in which a user may manipulate the plotted data may include, for example, showing trajectory data for the data point marker, or focusing on a single plot of the plural data density plots that were displayed in step 106. A user may also select to view further data such as raw or statistical data related to that shown in one or more of the probability distribution plots, or the user may observe different variables than those shown in the data density plots. The user may also choose to see a marker for a different data point. The method then ends, as indicated.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of data analysis to determine how a data point compares with historical data comprising:
    graphically displaying a data density graph using a contour plot, the contour plot related to a relationship between first and second variables and a historical frequency with which a given pair of values for the first and second variables has occurred; and
    superimposing an indicator on the data density graph indicative of values for the first and second variables relative to the data point.

2. A method of data analysis to determine how a data point compares with historical data comprising:
    graphically displaying a plurality of data density graphs using contour plots, each data density graph related to a relationship between respective first and second variables and a historical frequency with which a given pair of values for the respective first and second variables has occurred; and
    superimposing an indicator on the plurality of data density graphs indicative of values for the respective first and second variables relative to the data point.

3. The method of claim 2 further comprising determining whether a data point falls outside of a threshold contour in a data density graph and, if so, graphically highlighting the data density graph in which the data point falls outside of the threshold contour.

4. The method of claim 3 further comprising superimposing trajectory indicators indicating a trajectory related to the data point on the graphically highlighted data density graph.

5. The method of claim 2 wherein at least one of the data density graphs represents a probability density function shown in contour format.

6. The method of claim 2 wherein the contour lines for each of the data density graphs are normalized.

7. The method of claim 2 further comprising superimposing indicators on at least one of the plurality of data density graphs to indicate a trajectory of data points in the at least one of the plurality of data density graphs.

8. The system of claim 7 wherein at least one of the data density graphs represents a probability density function shown in contour format.

9. The system of claim 7 wherein contour lines in each of the data density graphs are normalized.

10. The system of claim 7 wherein the system is further adapted to superimpose trajectory indicators on at least one of the plurality of data density graphs.

11. A system adapted for analysis to determine how a data point compares with historical data, the system including a processor for processing data and a display apparatus for performing graphical display, wherein:
    the system graphically displays on the display apparatus a plurality of data density graphs using contour plots, each data density graph related to a relationship between respective first and second variables and a historical frequency with which a given pair of values for the respective first and second variables has occurred; and
    the system superimposes an indicator on the plurality of data density graphs indicative of values for the respective first and second variables relative to the data point.

12. The system of claim 11 wherein the processor is adapted to determine whether a data point falls outside of a threshold contour in a data density graph and, if so, the system graphically highlights the data density graph in which the data point falls outside of the threshold contour.

13. The system of claim 12 wherein the system is adapted to superimpose trajectory indicators on the graphically highlighted data density graph.

14. A computer program stored on a computer readable medium and includes computer readable instructions for performing a method of data analysis to determine how a data point compares with historical data, the method comprising:
    graphically displaying a plurality of data density graphs using contour plots, each data density graph related to a relationship between respective first and second variables and a historical frequency with which a given pair of values for the respective first and second variables has occurred; and
    superimposing an indicator on the plurality of data density graphs indicative of values for the respective first and second variables relative to the data point.

15. The computer program stored on the computer readable medium of claim 14 wherein the method further comprises determining whether the data point falls outside of a threshold contour in a data density graph and, if so, graphically highlighting the data density graph in which the data point falls outside of the threshold contour.

16. The computer program stored on the computer readable medium of claim 15 wherein the method further comprises superimposing trajectory indicators on the graphically highlighted data density graph.

17. The computer program stored on the computer readable medium of claim 14 wherein at least one of the data density graphs represents a probability density function shown in contour format.

18. The computer program stored on the computer readable medium of claim 14 wherein the contour lines in each of the data density graphs are normalized.

19. The computer program stored on the computer readable medium of claim 14 wherein the method further comprises superimposing trajectory indicators on at least one of the plurality of data density graphs.

20. The computer program stored on the computer readable medium of claim 14 embodied in computer readable media.

* * * * *